United States Patent
Schuhmacher et al.

(10) Patent No.: US 10,145,474 B2
(45) Date of Patent: Dec. 4, 2018

(54) SEALING ARRANGEMENT

(71) Applicant: ElringKlinger AG, Dettingen (DE)

(72) Inventors: Walter Schuhmacher, Bietigheim-Bissingen (DE); Klaus Hocker, Ingersheim (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 15/493,303

(22) Filed: Apr. 21, 2017

(65) Prior Publication Data

US 2017/0219099 A1 Aug. 3, 2017

Related U.S. Application Data

(63) Continuation of application No. PCT/EP2015/076258, filed on Nov. 10, 2015.

(30) Foreign Application Priority Data

Nov. 13, 2014 (DE) .................. 10 2014 223 162

(51) Int. Cl.
*F16J 15/32* (2016.01)
*F16J 15/3236* (2016.01)
*F16J 15/3208* (2016.01)
*F16J 15/3284* (2016.01)

(52) U.S. Cl.
CPC ....... *F16J 15/3236* (2013.01); *F16J 15/3208* (2013.01); *F16J 15/3284* (2013.01)

(58) Field of Classification Search
CPC ... F16J 15/3236; F16J 15/3208; F16J 15/3284

USPC .......................................................... 277/309
See application file for complete search history.

(56) References Cited

U.S. PATENT DOCUMENTS

| | | | | |
|---|---|---|---|---|
| 4,379,900 A | * | 4/1983 | Sulzbach | C08F 214/262 264/323 |
| 6,013,700 A | * | 1/2000 | Asano | C08J 3/12 264/117 |
| 2006/0103075 A1 | * | 5/2006 | Zahn | B62K 25/08 277/436 |

(Continued)

FOREIGN PATENT DOCUMENTS

| CN | 102954217 A | 3/2013 |
|---|---|---|
| CN | 203202221 U | 9/2013 |

(Continued)

*Primary Examiner* — Nathan Cumar
(74) *Attorney, Agent, or Firm* — Aslan Law, P.C.

(57) ABSTRACT

In order to provide a sealing arrangement for sealing between a first medium chamber filled with a first medium and a second medium chamber filled with a second medium, in the region of a component which is movable along the longitudinal axis, which can be easily manufactured and has low leakage, it is proposed that the sealing arrangement comprises a sealing element which comprises at least one dynamic sealing portion which is placed or placeable on the movable component, wherein the at least one dynamic sealing portion comprises at least two sealing lips between which a leakage reservoir is formed, wherein the leakage reservoir is partially delimited by two boundary surfaces of the sealing lips arranged facing one another, wherein the leakage reservoir is formed at least partially by a concave recess in at least one or between the at least two boundary surfaces of the sealing lips.

14 Claims, 6 Drawing Sheets

(56) References Cited

U.S. PATENT DOCUMENTS

2008/0122184 A1\* 5/2008 Hocker ............... F02M 59/442
 277/366
2013/0043660 A1 2/2013 Daub et al.
2014/0197599 A1\* 7/2014 Nahrwold ............... F16J 15/34
 277/307

FOREIGN PATENT DOCUMENTS

| CN | 203880094 U | 10/2014 |
|---|---|---|
| DE | 10 2013 000 514 A1 | 7/2014 |
| EP | 0 041 687 A1 | 12/1981 |
| EP | 0 931 798 A1 | 7/1999 |
| FR | 2 328 143 A1 | 5/1977 |
| GB | 1 551 421 A | 8/1979 |
| JP | 2012092976 A | 5/2012 |
| WO | WO 2008/061581 A1 | 5/2008 |

\* cited by examiner

SEALING ARRANGEMENT

RELATED APPLICATION

This application is a continuation of international application No. PCT/EP2015/076258 filed on Nov. 10, 2015, and claims the benefit of German application No. 10 2014 223 162.0 filed on Nov. 13, 2014 which are incorporated herein by reference in their entirety and for all purposes.

FIELD OF DISCLOSURE

The present invention relates to a sealing arrangement for sealing between a first medium chamber filled with a first medium and a second medium chamber filled with a second medium, in the region of a movable component.

Such a sealing arrangement is known, for example, from WO 2008/061581 A1.

SUMMARY OF THE INVENTION

It is an object of the present invention to provide a sealing arrangement which is easily producible and has low leakage.

This object is achieved according to the invention by a sealing arrangement for sealing between a first medium chamber filled with a first medium and a second medium chamber filled with a second medium, in the region of a movable component, wherein the component is displaceable along a longitudinal axis of the movable component and/or is rotatably guided or guidable through the sealing arrangement along the longitudinal axis, wherein the sealing arrangement comprises a sealing element which comprises at least one dynamic sealing portion which is placed or placeable on the movable component, wherein the at least one dynamic sealing portion comprises at least two sealing lips between which a leakage reservoir is formed, wherein the leakage reservoir is partially delimited by two boundary surfaces of the sealing lips arranged facing one another, wherein the leakage reservoir is formed at least partially by a concave recess in at least one or between the at least two boundary surfaces of the sealing lips.

In the sealing arrangement according to the invention, therefore, an enlarged leakage reservoir is formed between two sealing lips due to the concave recess, so that in the operational state of the sealing arrangement, a relatively large quantity, in particular a relatively large volume of a medium to be sealed can be accommodated between two sealing lips. An unwanted carry-through of the medium through both the sealing lips can thus preferably be minimised.

It can be favourable if one or both of the boundary surfaces of the sealing lips facing one another are frusto-conical surfaces.

Preferably, all the boundary surfaces of all the sealing lips of the sealing arrangement are frusto-conical surfaces.

It can be favourable if two boundary surfaces of the sealing lips facing one another are frusto-conical surfaces of truncated cones which widen toward one another.

Preferably, the truncated cones have apex angles which differ from one another.

In one embodiment of the invention, it can be provided that the boundary surfaces arranged facing one another enclose mutually different angles with a surface of the movable component and/or with the longitudinal axis.

In particular, it can be provided that an angle between the surface of the movable component and/or the longitudinal axis, on one side, and one of the two boundary surfaces arranged facing one another, on the other side, differs from an angle which is enclosed by the surface of the movable component and/or the longitudinal axis, on one side, and the further boundary surface of the boundary surfaces arranged facing one another.

It can be advantageous if an axially inner boundary surface of an axially outer sealing lip encloses a smaller angle with the longitudinal axis than an axially outer boundary surface of an axially inner sealing lip.

An axially inner boundary surface or an axially inner sealing lip should be understood in this description and the accompanying claims as an embodiment of the sealing arrangement such that this boundary surface or sealing lip lies, relative to a longitudinal axis of the movable component and/or of the overall sealing arrangement, closer to a transverse central plane of the sealing arrangement taken perpendicularly to the longitudinal axis than an axially outer boundary surface or an axially outer sealing lip.

Each sealing lip preferably has an axially inner boundary surface and an axially outer boundary surface.

The two boundary surfaces of a sealing lip adjoin one another at a sealing edge of the sealing lip. In the operational state of the sealing arrangement, the sealing edge of the sealing lip preferably abuts the movable component.

It is advantageously provided that an axially inner boundary surface of an axially outer sealing lip of a dynamic sealing portion of the sealing arrangement encloses a smaller angle with the longitudinal axis than an axially outer boundary surface of an axially inner sealing lip of the same dynamic sealing portion.

It can also be provided that an axially inner boundary surface of a sealing lip encloses a smaller angle with the longitudinal axis than an axially outer boundary surface of the same sealing lip. The axially outer boundary surface can then serve, in particular, as a "wiper", whilst the axially inner boundary surface preferably enables a simplified conveying back into the associated medium chamber of medium carried through under the sealing lip.

It can be favourable if the concave recess is formed substantially annular in at least one of two boundary surfaces of the sealing lips.

It can be advantageous if the recess is configured substantially rotationally symmetrical about the longitudinal axis of the movable component and/or the sealing arrangement.

The longitudinal axis of the movable component is preferably simultaneously the longitudinal axis of the sealing arrangement.

It can be favourable if the sealing arrangement comprises a plurality of leakage reservoirs with different volumes.

In particular, it can be provided that the sealing arrangement comprises a plurality of leakage reservoirs which have differently dimensioned recesses.

The sealing element of the sealing arrangement is preferably configured as a single piece.

It can be advantageous if the sealing element comprises a plastics material, for example, is made of a PTFE material. The sealing element can be made, for example, of a polytetrafluoroethylene compound or a modified polytetrafluoroethylene compound or an, in particular injection-mouldable, fluoropolymer thermoplastics or an, in particular injection mouldable, fluoropolymer thermoplastics compound.

It can be advantageous if at least one dynamic sealing portion of the sealing element comprises at least one leakage reservoir which is formed between two mutually adjacent sealing lips of the dynamic sealing portion.

The sealing arrangement is suitable, in particular, for use in a high pressure pump.

The sealing arrangement then preferably serves for sealing a piston of the high pressure pump.

It can be favourable if the sealing arrangement for sealing the piston of a high pressure pump is used for the direct injection of fuel, for example petrol, into the cylinders of an internal combustion engine. Preferably, by means of a first dynamic sealing portion, a fuel-side (petrol-side) and/or by means of a second dynamic sealing portion, a motor oil-side can be sealed.

The first dynamic sealing portion and the second dynamic sealing portion are preferably mutually different sealing portions of the sealing arrangement.

A region of the sealing arrangement arranged between the two dynamic sealing portions is preferably subjected during operation of the sealing arrangement as little as possible to the media to be sealed against, in particular fuel and/or engine oil.

The present invention preferably relates to a high pressure pump which comprises one or more of the sealing arrangements according to the invention.

The present invention further relates to the use of a high pressure pump, in particular a high pressure pump according to the invention, for injecting fuel into an internal combustion engine.

The present invention further relates to the use of a sealing arrangement, in particular a sealing arrangement according to the invention for sealing between a first medium chamber filled with a first medium and a second medium chamber filled with a second medium, in the region of a movable component, wherein a volume 135 of a leakage reservoir of a dynamic sealing portion of the sealing arrangement and at least one medium to be sealed by means of the dynamic sealing portion have been or are selected so that the volume of the leakage reservoir is greater than a volume of the medium wherein the volume of the medium is formed by a stroke 139 of the movable component multiplied by a cross-sectional area of a lubrication film formed by means of the medium on the movable component.

A stroke of the movable component should be understood in this description and the accompanying claims to be a movement distance in the longitudinal direction (along the longitudinal axis) which the component covers, particularly periodically.

The cross-sectional area of the lubrication film is, in particular, a cross-sectional area taken perpendicularly to the longitudinal axis.

A lubricant film of the medium is, in particular, a leakage film of the medium which is carried through, in particular, under an axial outer sealing lip of a dynamic sealing portion directed inwardly in the axial direction.

Preferably, the sealing arrangement comprises one or more spring elements by means of which the one or the plurality of dynamic sealing portions are biased or biasable against the movable component, in particular a piston sliding surface of the movable component.

The first and/or the second medium is preferably a liquid.

In particular, the first medium and the second medium can be mutually different liquids.

Of the two dynamic sealing portions of the sealing element, one has at least two sealing lips, whilst the other has at least one sealing lip.

In a preferred embodiment of the sealing arrangement according to the invention, it is provided that both dynamic sealing portions each have at least two sealing lips.

A still better sealing effect is achieved if at least one of the dynamic sealing portions has at least three sealing lips.

It is particularly favourable for achieving low leakage values if both the dynamic sealing portions each have at least three sealing lips.

The sealing element is preferably constructed annular and, in particular, rotationally symmetrical in relation to the longitudinal direction of the movable component.

In order that the sealing element can be utilized in the sealing arrangement both in a starting position and also in a position rotated by 180° relative to the starting position, it is preferably provided that the sealing element is configured substantially bilaterally symmetrical in relation to a transverse central plane of the sealing element extending perpendicularly to the longitudinal direction of the movable component. In this way, the mounting of the sealing arrangement is substantially simplified.

In a preferred embodiment of the sealing arrangement according to the invention, it is provided that the first sealing region comprises a first static sealing portion arranged radially outwardly from the first dynamic sealing portion.

It is further preferably provided that the second sealing region comprises a second static sealing portion arranged radially outwardly from the second dynamic sealing portion.

The first static sealing portion and the second static sealing portion preferably sealingly abut a seal carrier into which the sealing element is inserted.

The static sealing portions can have substantially the same extent as the associated dynamic sealing portions in the axial direction of the sealing element, i.e. in the direction extending parallel to the longitudinal direction of the movable component. In particular, the axial ends of the static sealing portions can have the same spacing from a transverse central plane of the sealing element as the axial ends of the dynamic sealing portions.

Alternatively thereto, however, it can also be provided that at least one static sealing portion protrudes in the axial direction beyond the associated dynamic sealing portion of the same sealing region. It can be achieved in this way that the sealing element is supported only over the relevant static sealing portion on a seal carrier into which the sealing element is inserted and that on pressing the sealing element into the seal carrier, the associated dynamic sealing portion is not loaded.

At least one static sealing portion of the sealing element can be supported in the axial direction on a seal carrier or on another component of the sealing arrangement.

The sealing element of the sealing arrangement according to the invention advantageously comprises a fluoropolymer material.

In particular, it can be provided that the sealing element is a polytetrafluoroethylene (PTFE) or a modified polytetrafluoroethylene.

A "modified polytetrafluoroethylene" should be understood to mean a PTFE-like substance in which the molecular structure of the PTFE has been chemically modified so that apart from tetrafluoroethylene, a further also perfluorinated monomer has also been included in the molecular chain so that the fluorine atoms of the PTFE are partially replaced by substituents.

The chemical composition and production of "modified PTFE" are described, for example, in EP 0 041 687 A1, EP 0 931 798 A1 and the U.S. Pat. No. 6,013,700.

Such PTFE-containing materials have a particularly good temperature and chemical resistance as well as good run-dry properties.

The sealing element can consist of polytetrafluoroethylene or a modified polytetrafluoroethylene.

Alternatively thereto, it can also be provided that the sealing element is made of a polytetrafluoroethylene compound or a modified polytetrafluoroethylene compound, i.e. from a mixture of a polytetrafluoroethylene or a modified polytetrafluoroethylene with one or more organic or inorganic fillers.

In order, during a stroke movement of the movable component, temporarily to store leakage medium that has passed a sealing lip of the sealing element and, during a reverse stroke of the movable component to be able to convey it back again to the correct medium side, it is advantageous if at least one dynamic sealing portion of the sealing element has at least one leakage reservoir which is formed between two adjacent sealing lips of the relevant dynamic sealing portion.

Such a leakage reservoir is preferably constructed annular.

It is particularly favourable if at least one dynamic sealing portion of the sealing element has a plurality of leakage reservoirs following one another in the longitudinal direction of the movable component.

Herein, the leakage reservoirs of a dynamic sealing portion can all be substantially the same size.

Alternatively thereto, however, it can also be provided that the leakage reservoirs of the dynamic sealing portion have different sizes in order to take account of the circumstance that the leakage quantity decreases from the axial ends of the sealing element toward the centre of the sealing element, since the leakage media must pass an increasing number of sealing lips in order to reach closer to the centre of the sealing element.

Leakage reservoirs of differing sizes can be generated in that the sealing lips which delimit the leakage reservoirs have different internal diameters in the manufactured state of the sealing element. On mounting of the sealing arrangement, these sealing lips are then deformed so that they have an internal diameter corresponding to the external diameter of the movable component, in order that during operation of the sealing arrangement, the sealing lips sealingly abut the sealing surface of the movable component.

It is preferably provided that the size of the leakage reservoirs decreases with increasing spacing from a medium chamber-side axial end of the sealing element.

This can be achieved, in particular, in that, in the manufactured state of the sealing element, the internal diameter of the sealing lips which delimit the leakage reservoirs increases with increasing spacing from a medium chamber-side end of the sealing element.

At least one sealing lip of the sealing element is preferably configured so that it has two boundary surfaces which are inclined at different angles relative to a plane extending perpendicularly to the longitudinal direction of the movable component.

Herein, the boundary surface which faces toward the nearest medium chamber-side end of the sealing element is preferably inclined at a smaller angle relative to the plane extending perpendicularly to the longitudinal direction of the movable component than the boundary surface which faces in the direction facing away from the nearest medium chamber-side end of the sealing element. It is achieved with this design of the sealing lip that the leakage medium can pass only with difficulty in the direction away from a medium chamber-side end of the sealing element, but can easily be carried back in the contrary direction to a medium chamber-side end of the sealing element.

The sealing lips of the sealing element of the sealing arrangement according to the invention can have sharply delimited sealing edges abutting a sealing surface of the movable component only along a line.

Alternatively thereto, it can also be provided that at least one dynamic sealing portion of the sealing element has at least one flattened sealing lip which is supported on the movable component with a supporting surface oriented substantially parallel to the longitudinal direction of the movable component in the mounted state of the sealing arrangement. By means of this, in comparison with a sharp sealing edge, larger supporting surface, the specific surface pressure on the relevant sealing lip is reduced and the percentage contact area of the sealing lip in the new condition is increased, whereby the sealing lip wear is reduced and the lifespan of the sealing element is extended.

The sealing lip wear is then lessened by the flattened form of the sealing lip, in particular if one of the media in contact with the sealing element contains dirt particles (for example, in the case of dirty oil).

In order to keep dirt particles from at least one of the two medium chambers, for example, from a medium chamber filled with engine oil, away from the sealing lips of the sealing element, it is favourable if at least one dynamic sealing portion of the sealing element has a wiping lip in addition to the sealing lips.

In particular, it can be provided that the wiping lip protrudes in the axial direction beyond a static sealing portion of the same sealing region of the sealing element.

The sealing element can be configured symmetrical if both dynamic sealing portions of the sealing element each have a wiping lip in addition to the sealing lips. In this event, the orientation of the sealing element relative to the movable component is not of critical importance, so that the sealing element can be mounted in two positions rotated by 180° to one another, simplifying the mounting of the sealing arrangement according to the invention.

The mean differential pressure between the first medium chamber and the second medium chamber during operation of the sealing arrangement is at least approximately 5 bar, in particular at least approximately 10 bar. Even with such high mean differential pressures, the sealing arrangement according to the invention preferably ensures a reliable sealing between the two medium chambers with very low leakage values.

Due to pressure pulsations, the maximum differential pressure between the first medium chamber and the second medium chamber can be up to approximately 15 bar above the mean differential pressure.

Preferably, the maximum differential pressure between the medium chambers is at least approximately 20 bar.

With a high pressure pump, for example, in order to increase the output of petrol engines, the fuel (petrol) is injected directly into the cylinders of the internal combustion engine, similarly to the common-rail system for diesel engines. In order to generate the high petrol pressure required for this, a high pressure reciprocating pump is used. The pistons of this high pressure pump are powered by the camshaft with special cams and restored by means of spring elements. In order to seal the petrol side against the camshaft side which is filled with engine oil, the sealing arrangement according to the invention can be used.

As a result of the low petrol leakage values of the sealing arrangement according to the invention, the entry of too much petrol into the engine oil, which could cause oil thinning resulting in engine failure, is prevented.

Similarly, the sealing arrangement according to the invention prevents too much engine oil entering the petrol, which could lead to filter and nozzle blockages and thus also to engine failure.

It further enables the sealing arrangement according to the invention not only to seal the pressurized petrol, but also to wipe off the almost pressure-free oil of the camshaft in an efficient manner.

Through the increased number of sealing lips which, for sealing, abut the movable component, the sealing lip and sealing edge wear is reduced so that the sealing arrangement according to the invention is usable over a longer period.

Preferably, the high pressure pump and/or the uses according to the invention have individual or a plurality of the features and/or advantages described in relation to the sealing arrangement according to the invention.

Furthermore, the sealing arrangement according to the invention, the high pressure pump according to the invention and the uses according to the invention have individual or a plurality of the features and/or advantages described below:

Preferably, a leakage quantity of a medium carried through under a sealing lip of a dynamic sealing portion is able to be accommodated completely by means of a leakage reservoir adjoining this sealing lip.

An adjacent sealing lip is preferably arranged at a corresponding spacing from the first sealing lip. Furthermore, a leakage reservoir between the two sealing lips is dimensioned correspondingly large.

It can be favourable if the sealing arrangement has differently configured, in particular differently dimensioned, dynamic sealing regions.

It can be advantageous if the sealing arrangement comprises different spring elements for the different dynamic sealing portions.

Preferably, with sealing lips arranged spaced further from one another, enlarged leakage reservoirs are formed and optimum sealing edge angles (angles between the boundary surfaces and the longitudinal axis) and/or sealing edge profiles can be provided.

A profile of a sealing edge can be adapted, for example, to the viscosity of the medium to be sealed.

For example, with a more viscous medium, a pointed sealing edge profile (V-profile) can be used, whereas with a thinner medium a round, rounded or flattened sealing edge profile (for example, a U-profile) is provided. By this means, in particular, an optimum wiping effect adapted to the medium viscosity can be achieved.

Preferably, a lubricant film thickness (leakage film thickness) can be reduced for reduction of the leakage quantity.

A minimum lubricant film can preferably be maintained, in particular to prevent running dry and to minimize friction between the sealing element and the movable component.

It can be advantageous if the sealing arrangement comprises a dynamic sealing portion for sealing a pressure-free medium chamber, wherein the medium in the pressure-free medium chamber is, for example, a viscous medium, for example, oil. This dynamic sealing portion is preferably pressable by means of a reinforced spring element against the movable component. Sealing edges of sealing lips of the dynamic sealing portion for sealing this medium chamber are configured, for example, pointed or sharp-edged.

Alternatively or additionally thereto, it can be provided that the sealing arrangement comprises a dynamic sealing portion which seals a pressurized, i.e. placed under pressure, medium chamber. The medium in this medium chamber is, for example, a thin medium, for example a fuel. Preferably, a spring element with a low spring strength is provided, by means of which the dynamic sealing portion is pressable against the movable component. Sealing edges of sealing lips of the dynamic sealing portion are preferably configured rounded or flattened.

It can be advantageous if a leakage reservoir on an oil side of the sealing arrangement is larger than a leakage reservoir on a petrol side (fuel side) of the sealing arrangement.

A radius of a rounded sealing edge can be, for example, at most approximately 0.3 mm, for example, at most approximately 0.2 mm, in particular approximately 0.1 mm. Alternatively or additionally thereto, it can be provided that the radius is at least approximately 0.05 mm, for example, at least approximately 0.08 mm.

The concave recess in at least one or between the at least two boundary surfaces of the sealing lips is formed, for example, by an additional bend region 137 or curvature region 137 in at least one or between the at least two boundary surfaces. In particular, a fold region or a curvature region is provided which extends away from the movable component.

The recess is, in particular, an indentation in the sealing element which extends further into the sealing element than the two boundary surfaces arranged facing one another, as far as an (imaginary) intersection line thereof.

It can be advantageous if the sealing arrangement comprises an identification by means of which a preferred orientation of the sealing arrangement is easily identified for a directional installation thereof.

Further features and/or advantages of the invention are the subject matter of the following description and of the drawings illustrating exemplary embodiments.

Figure 1:
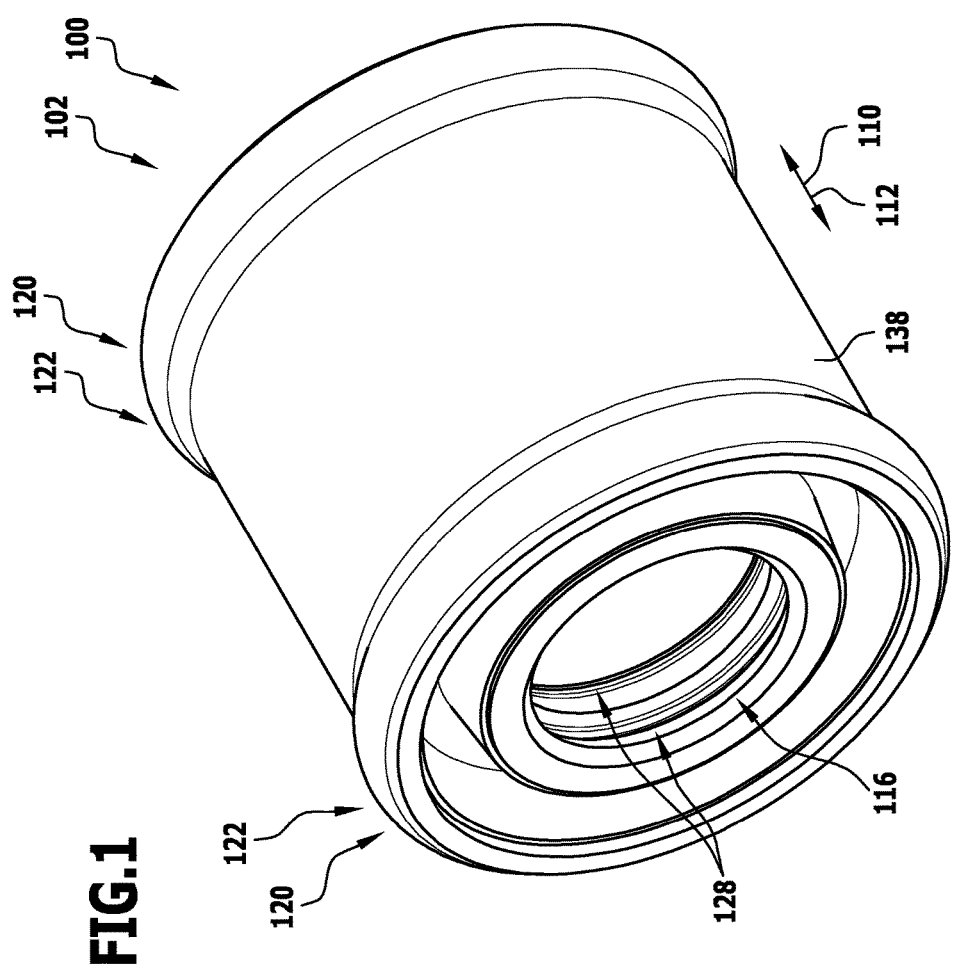
FIG. 1 shows a schematic perspective representation of a first embodiment of a sealing arrangement.
Figure 2:
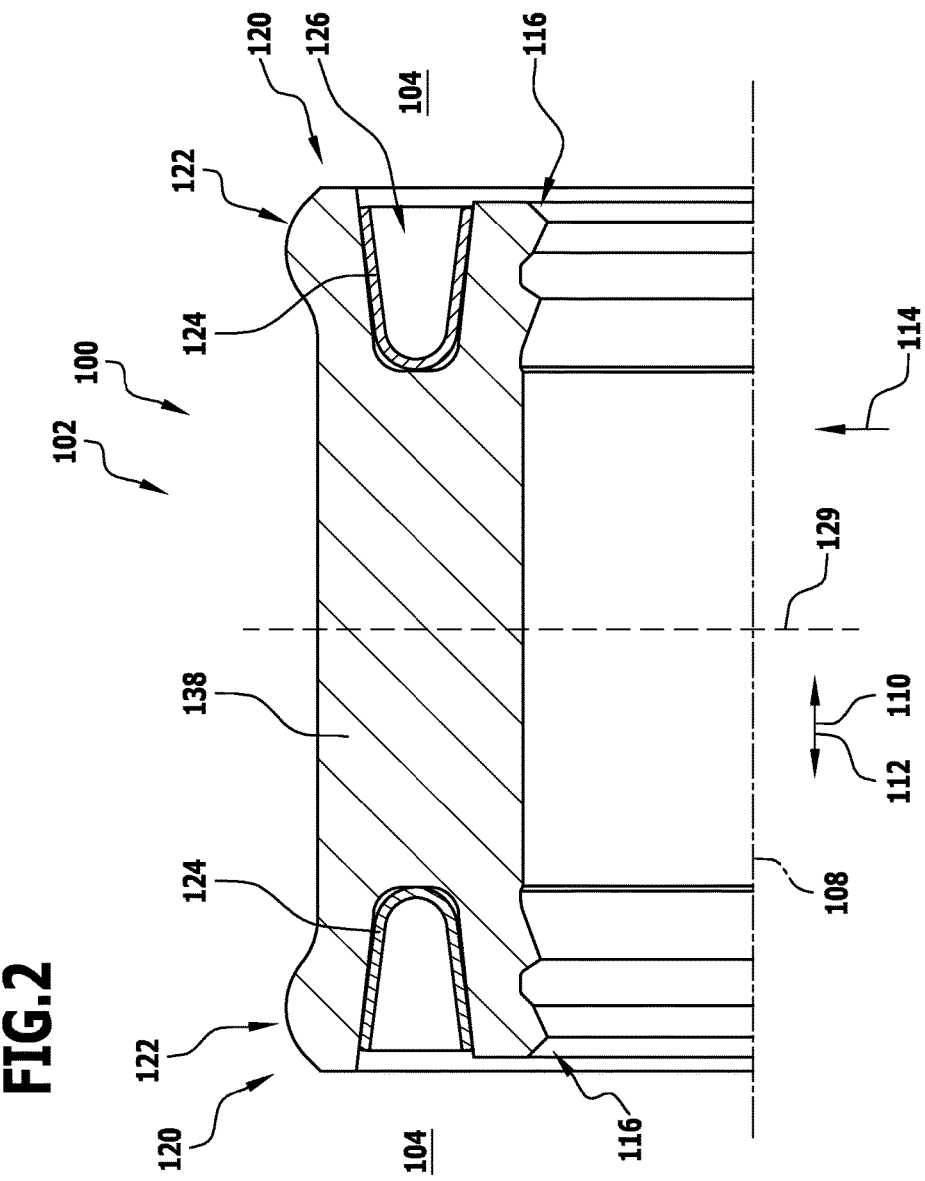
FIG. 2 shows a partial longitudinal section through the sealing arrangement of FIG. 1.
Figure 3:
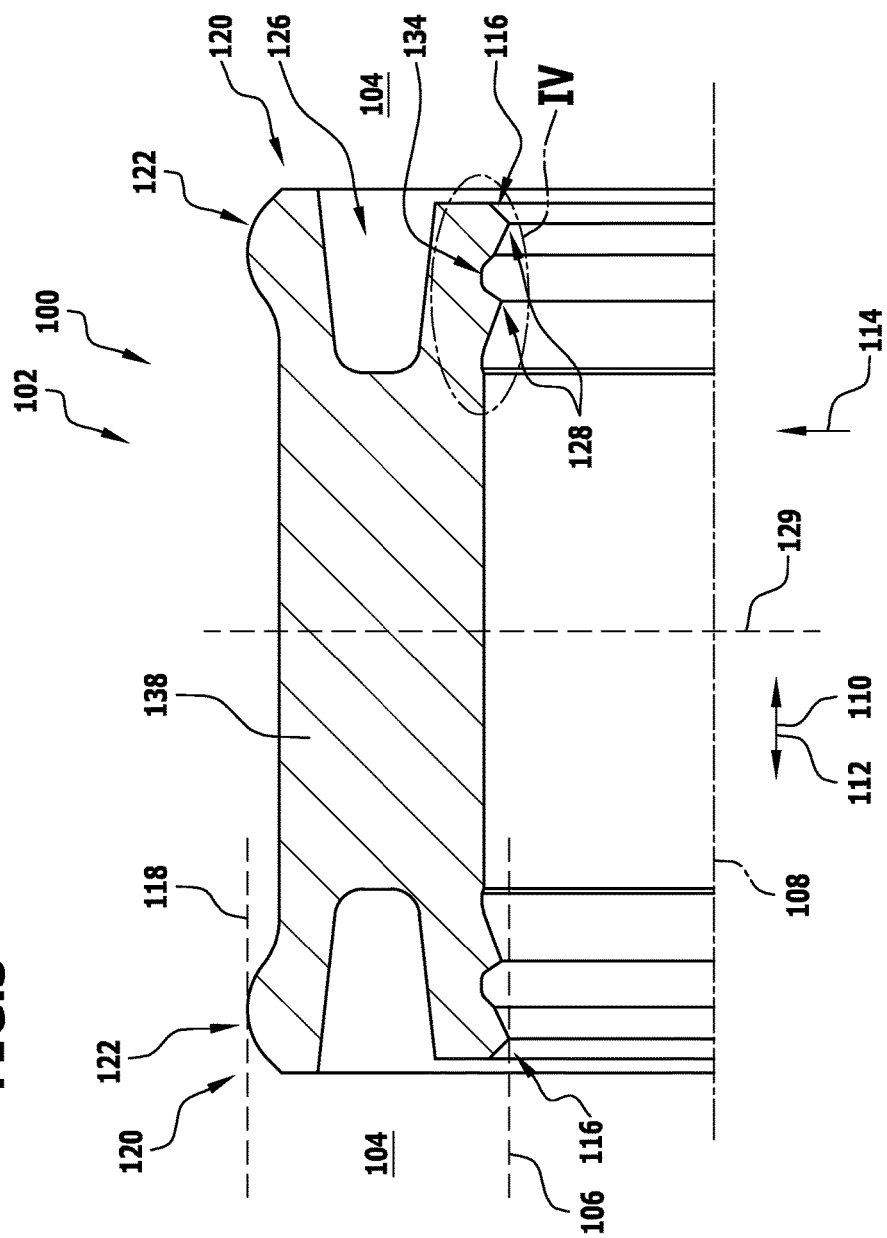
FIG. 3 shows a schematic representation according to FIG. 2 of a sealing element of the sealing arrangement of FIG. 2.

The same or functionally equivalent elements are provided in all the drawings with the same reference signs.

DETAILED DESCRIPTION OF THE DRAWINGS

An embodiment shown in FIGS. 1 to 4 of a sealing arrangement identified overall as 100 is, for example, a component of a high pressure pump 102 and serves for sealing between two medium chambers 104 in the region of a movable component 106.

The movable component 106 can be, for example, a piston of the high pressure pump 102.

The movable component 106 is guided, in particular, through the sealing arrangement 100.

Both the movable component 106 and also the sealing arrangement 100 are herein preferably configured rotationally symmetrical about a symmetry axis 108.

The symmetry axis 108 is oriented, in particular, parallel to a longitudinal axis 110 of the movable component 106 and the sealing arrangement 100.

The sealing arrangement 100 and the movable component 106 have a common symmetry axis 108 in the mounted state.

The longitudinal axis 110 preferably defines an axial direction 112.

A direction oriented perpendicularly to the axial direction 112 is a radial direction 114.

By means of the sealing arrangement 100, the medium chambers 104 are preferably separated from one another in the axial direction 112.

The sealing arrangement 100 herein adjoins the movable component 106 in the radial direction 114 directed inwardly by means of two dynamic sealing portions 116.

In the radial direction 114 directed outwardly, the sealing arrangement 100 adjoins a housing 118 of the high pressure pump 102.

In the mounted state, the sealing arrangement 100 is fixed relative to the housing 118, in particular non-rotatably connected to the housing 118.

Two of the sealing regions 120 of the sealing arrangement 100 associated with the two media chambers 104 thus comprise, in addition to the dynamic sealing portions 116, two further static sealing portions 122 abutting the housing 118.

The dynamic sealing portions 116 serve for dynamic sealing between the sealing arrangement 100 and the component 106 moving relative to the sealing arrangement 100, in particular, displaceable along the axial direction 112.

In order to achieve an enhanced sealing effect, one or more spring elements 124 of the sealing arrangement 100 can be provided.

The one or more spring elements 124 are arrangeable or arranged, in particular, in one or more spring element receptacles 126.

By means of the one or the plurality of spring elements 124, in particular one or a plurality of dynamic sealing portions 116 are pressable onto the movable component 106.

Alternatively or additionally hereto, it can be provided that by means of the one or more spring elements 124, one or more static sealing portions 122 are pressable onto a housing 118 of the high pressure pump 102.

Figure 4:
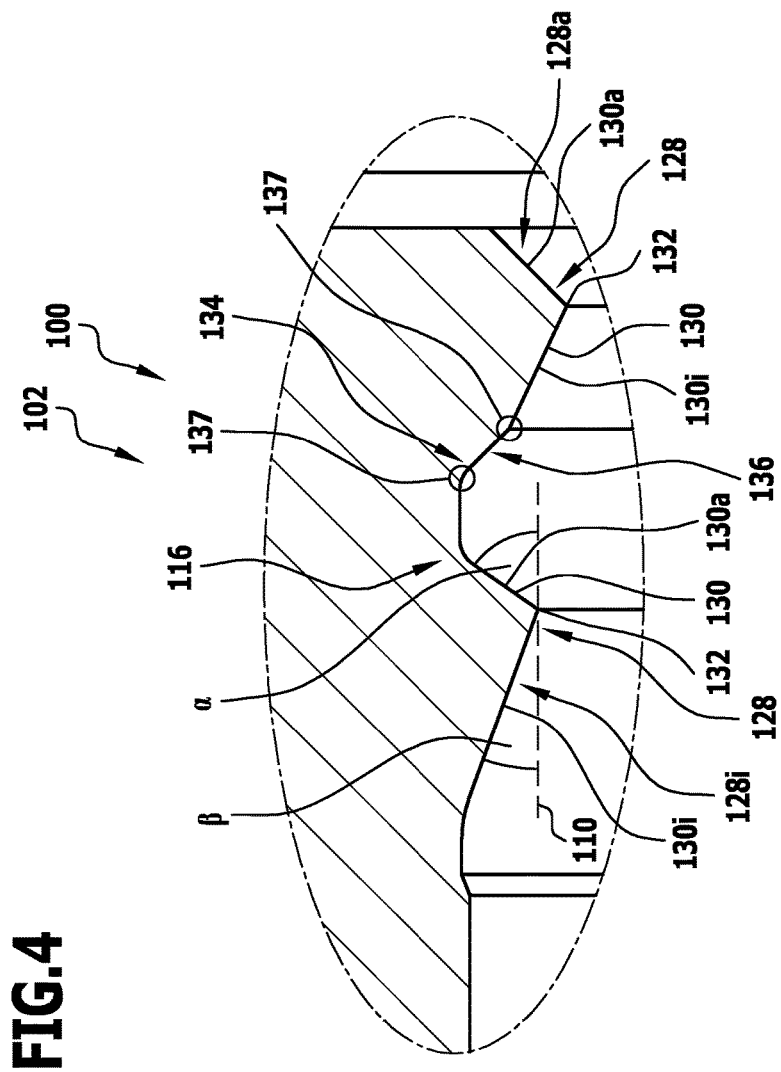
FIG. 4 shows an enlarged representation of the region IV in FIG. 3.

As shown, in particular, by the enlarged representation of a dynamic sealing portion 116 in FIG. 4, each dynamic sealing portion 116 preferably comprises a plurality of sealing lips 128.

Each sealing lip 128 is preferably configured substantially annular and substantially rotationally symmetrical about the symmetry axis 108.

The sealing lips 128 are herein arranged at different spacings from a transverse central plane 129 of the sealing arrangement 100 extending perpendicularly to the longitudinal axis 110 of the sealing arrangement 100.

A sealing lip 128 arranged closer to the transverse central plane 129 of a dynamic sealing portion 116 is herein designated the axially inner sealing lip 128i. A sealing lip 128 arranged further removed from the transverse central plane 129 is an axially outer sealing lip 128a.

The axially outer sealing lip 128a is thus arranged facing toward the medium chamber 104 to be sealed.

The axially inner sealing lip 128i is arranged on a side of the axially outer sealing lip 128a facing away from the medium chamber 104.

Each sealing lip 128 is formed by two substantially conically shaped, in particular, frusto-conically shaped boundary surfaces 130.

The boundary surfaces 130 of each sealing lip 128 herein adjoin one another at a sealing edge 132.

The sealing edge 132 is that portion of the sealing lip 128 which in the operating state of the sealing arrangement 100 comes into contact with the movable component 106, if necessary, separated by a thin lubricant film layer a.

In the embodiment of the sealing arrangement 100 shown in FIGS. 1 to 4, the sealing edge 132 of each sealing lip 128 is configured substantially tapering, that is V-shaped.

Each of the sealing lips 128 comprises an axially inner boundary surface 130i arranged closer to the transverse central plane 129 and an axially outer boundary surface 130a arranged further removed from the transverse central plane 129.

The axially outer boundary surface 130a encloses a wiping angle α (alpha) with the longitudinal axis 110.

The axially inner boundary surface 130i encloses a return conveying angle β (beta) with the longitudinal axis 110.

The wiping angle α is selected to be larger than the return conveying angle β In this way, medium moved from the medium chamber 104 in the direction of the sealing arrangement 100 can initially be wiped off the movable component 106 efficiently.

A proportion of the medium nevertheless carried through under a sealing lip 128 is simply fed, due to the smaller return conveying angle β, by means of the movable component 106 back under the sealing lip 128 through into the medium chamber 104.

A leakage reservoir 134 is formed between the two sealing lips 128 of the dynamic sealing portion 116.

The leakage reservoir 134 serves, in particular, for the accommodation of medium from the medium chamber 104 which has been carried through under the axially outer sealing lip 128a and has been wiped off the movable component 106 at the axially inner sealing lip 128i. This medium collects in the leakage reservoir 134 and can impair the sealing function of the sealing arrangement 100.

In particular, a filled leakage reservoir 134 can lead to a large leakage quantity being carried through under both sealing lips 128a, 128i.

For an efficient sealing effect of the dynamic sealing portion 116, an enlarged leakage reservoir 134 is therefore preferably provided.

The expression "enlarged" relates herein in particular to a leakage reservoir 134 which with conventional sealing arrangements 100 is formed merely by means of the two boundary surfaces 130 of the two sealing lips 128 arranged facing one another.

Preferably, with an enlarged leakage reservoir 134, a recess 136 is provided in at least one of the boundary surfaces 130 or between the two boundary surfaces 130.

The recess 136 is, in particular, a concave recess which extends, starting from one or both of the boundary surfaces 130 and/or between the two boundary surfaces 130 in a radial direction 114 outwardly from the component 106.

The leakage reservoir 134 is in particular configured substantially annular and rotationally symmetrical about the symmetry axis 108.

The recess 136 which forms at least a part of the leakage reservoir 134 enables, in particular, a very flat configuration of the return conveying angle β in order to ensure a reliable conveying of medium fed through under a sealing lip 128 back into the medium chamber 104.

The embodiment 100 of a sealing arrangement described above functions as follows:

In the operational state of the sealing arrangement 100, the movable component 106 is moved linearly forward and backward along the longitudinal axis 110.

Medium adhering to the movable component 106 is herein preferably wiped off the movable component 106 by means of the sealing lips 128 in order to prevent an unwanted transfer of medium from the medium chambers 104 into the respective other medium chamber 104.

Complete wiping off can herein not be guaranteed by means of the sealing lips 128 and is also undesirable due to an otherwise undesirably high level of friction between the sealing arrangement 100 and the movable component 106.

In fact, a certain amount of lubricant film from the medium is always received on the movable component 106, and thus represents a leakage.

By means of the dynamic sealing portions 116 of the sealing arrangement 100, however, it can be ensured that at most a very small leakage quantity (medium quantity) is invariably fed past both sealing lips 128 of a dynamic sealing portion 116.

Preferably, due to the forming of the sealing lips 128 and the leakage reservoir 134, it is ensured that a leakage quantity carried past one or both sealing lips 128 is always conveyed back again into the medium chamber 104 by means of the movement of the movable component 106.

In the embodiment of the sealing arrangement 100 shown in FIGS. 1 to 4, two spring elements 124 are provided for stronger pressing-on of the sealing portions 116, 122 and thus for increasing the sealing effect.

However, it can also be provided that the sealing arrangement 100 comprises no spring elements 124 and thus comprises only one sealing element 138, preferably in one piece.

Figure 5:
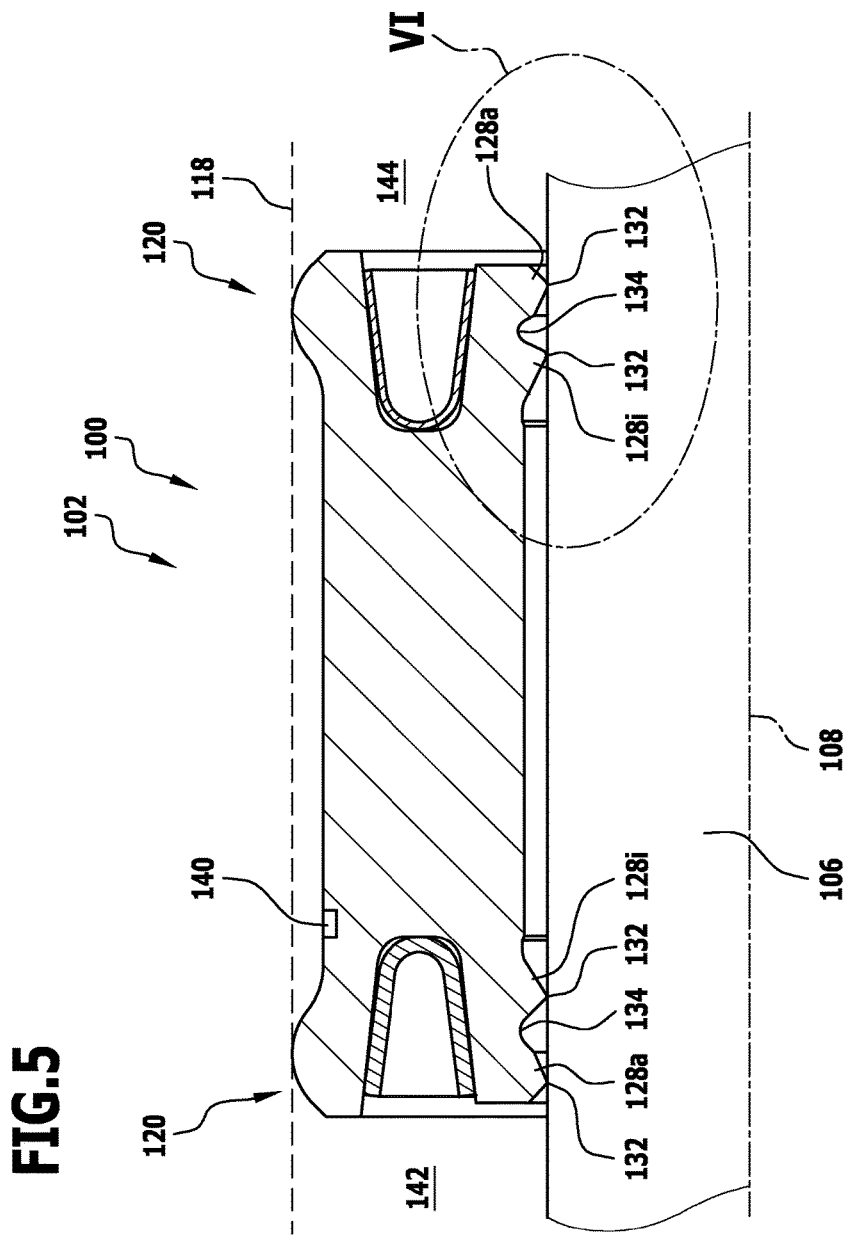
FIG. 5 shows a schematic representation according to FIG. 2 of a second embodiment of a sealing arrangement together with a movable component fed through the sealing arrangement.
Figure 6:
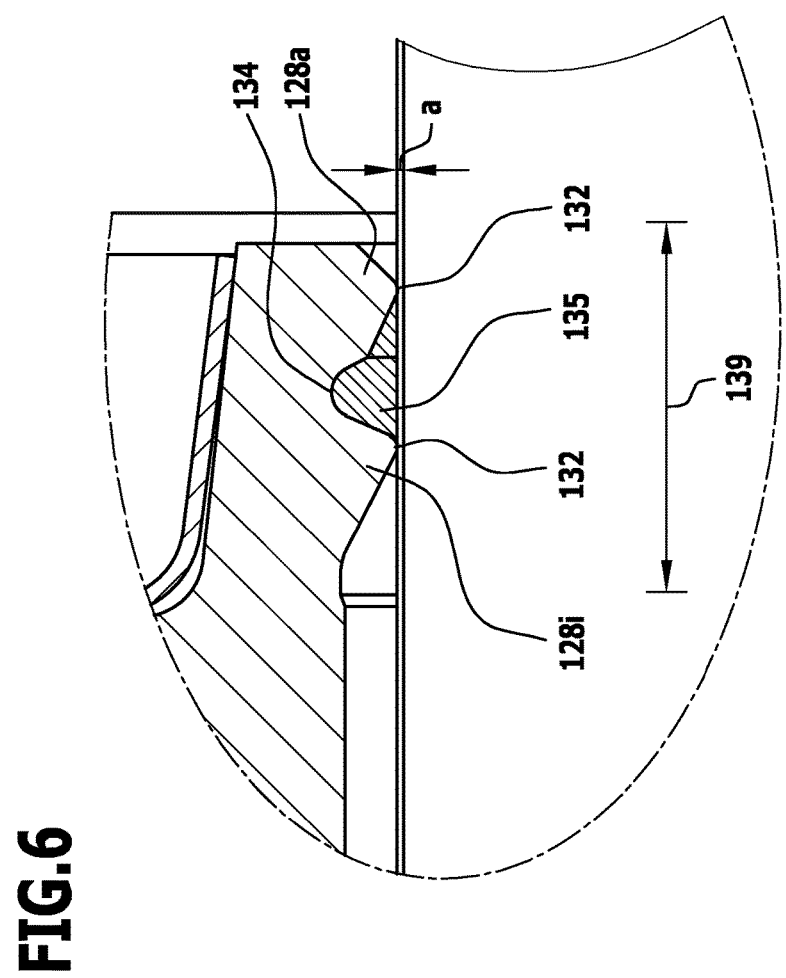
FIG. 6 shows a partial schematic representation according to FIG. 5.

A second embodiment of a sealing arrangement 100 shown in FIG. 5 differs from the first embodiment shown in FIGS. 1 to 4 substantially in that the spring elements 124 are differently dimensioned and thus have different spring forces.

Furthermore, the sealing edges 132 of the dynamic sealing portions 116 are preferably configured differently.

The sealing arrangement 100 thus has a preferred installation orientation.

By means of an identification 140 of the sealing arrangement 100, the preferred orientation can be easily determined in order to be able to ensure a reliable mounting and function of the sealing arrangement 100.

In the embodiment of the sealing arrangement 100 shown in FIG. 5, it is provided in particular that a pressure-free oil receiving chamber 142 is separated by means of the sealing arrangement 100 from a pressurised fuel receiving chamber 144.

The sealing region 120 which is associated with the oil receiving chamber 142 herein comprises a larger dimensioned spring element 124 which offers a correspondingly greater spring force. In addition, tapering (V-shaped) sealing edges 132 are provided in order to hold the medium arranged in the oil receiving chamber 142, in particular engine oil, reliably in the oil receiving chamber 142.

A sealing region 120 of the sealing arrangement 100 associated with the fuel receiving chamber 144 comprises a dynamic sealing portion 116 with preferably rounded sealing edges 132. Furthermore, a more weakly dimensioned spring element 124 is provided which correspondingly applies a smaller spring force.

The leakage reservoir 134 in the sealing region 120 associated with the oil receiving chamber 142 is preferably dimensioned larger than the leakage reservoir 134 in the sealing region 120 associated with the fuel receiving chamber 144.

In particular, the leakage reservoirs 134 are dimensioned and the sealing lips 128 arranged and configured so that a leakage quantity of the respective medium which has been carried past an axially outer sealing lip 128a during a forward movement of the movable component 106 can be entirely accommodated in the leakage reservoir 134 and during a return movement (back movement) of the movable component 106 can be conveyed through under the axially outer sealing lip 128 and thus fed back into the medium chamber 104.

The design of the respective sealing region 120 is herein, in particular, adapted to a viscosity of the respective medium in order to achieve a reliable sealing effect.

In this regard and also otherwise, the second embodiment of the sealing arrangement 100 shown in FIG. 5 agrees with the first embodiment shown in FIGS. 1 to 4 with regard to structure and function, so that to this extent, reference is therefore made to its description above.

The invention claimed is:

1. Sealing arrangement for sealing between a first medium chamber filled with a first medium and a second medium chamber filled with a second medium, in the region of a movable component which is displaceable along a longitudinal axis of the movable component and/or is rotatably guided or guidable through the sealing arrangement along the longitudinal axis,
   wherein the sealing arrangement comprises a sealing element which comprises at least one dynamic sealing portion which is placed or placeable on the movable component,
   wherein the at least one dynamic sealing portion comprises at least two sealing lips,
   wherein each sealing lip has an axially inner boundary surface and an axially outer boundary surface,
   wherein the axially inner boundary surface and the axially outer boundary surface of each sealing lip adjoin one another at a sealing edge of the sealing lip,
   wherein at least one leakage reservoir is formed between the sealing lips,
   wherein the at least one leakage reservoir is partially delimited by the two boundary surfaces of the sealing lips which boundary surfaces are arranged facing one another,
   wherein the two boundary surfaces of the at least one leakage reservoir of the sealing lips facing one another are frustoconical surfaces of truncated cones which widen toward one another and which intersect at an imaginary intersection line,
   wherein the at least one leakage reservoir is formed at least partially by a concave recess in at least one or between the at least two boundary surfaces of the sealing lips facing one another,
   wherein the concave recess is an indention within the at least one leakage reservoir of the sealing element and extends further into the sealing element at least of radially and axially.

2. Sealing arrangement according to claim 1, wherein the concave recess is formed by a sharp bend region or a curvature region which extends away from the movable component.

3. Sealing arrangement according to claim 1, wherein the boundary surfaces arranged facing one another enclose mutually different angles ($\alpha$, $\beta$) with a surface of the movable component and/or with the longitudinal axis.

4. Sealing arrangement according to claim 1, wherein an axially inner boundary surface of an axially outer sealing lip encloses a smaller angle with the longitudinal axis than an axially outer boundary surface of an axially inner sealing lip.

5. Sealing arrangement according to claim 1, wherein an axially inner boundary surface of a sealing lip encloses a smaller angle with the longitudinal axis than an axially outer boundary surface of the same sealing lip.

6. Sealing arrangement according to claim 1, wherein the concave recess is formed substantially annular and/or substantially rotationally symmetrical about the longitudinal axis.

7. Sealing arrangement according to claim 1, wherein the sealing arrangement comprises a plurality of leakage reservoirs with different volumes, in particular a plurality of leakage reservoirs with differently dimensioned concave recesses.

8. Sealing arrangement according to claim 1, wherein the sealing element is configured as a single piece.

9. Sealing arrangement according to claim 1, wherein the sealing element comprises a plastics material, in particular is made of a PTFE material.

10. Sealing arrangement according to claim 9, wherein the sealing element is made of a polytetrafluoroethylene compound or a modified polytetrafluoroethylene compound or an, in particular injection-mouldable, fluoropolymer thermoplastics or an, in particular injection mouldable, fluoropolymer thermoplastics compound.

11. Sealing arrangement according to claim 1, wherein at least one dynamic sealing portion of the sealing element comprises at least one leakage reservoir which is formed between two mutually adjacent sealing lips of the dynamic sealing portion.

12. High pressure pump comprising at least one sealing arrangement according to claim 1.

13. Use of a high pressure pump according to claim 12 for injecting a fuel into an internal combustion engine.

14. Use of a sealing arrangement, in particular according to claim 1, for sealing between a first medium chamber filled with a first medium and a second medium chamber filled with a second medium, in the region of a movable component, wherein a volume of the leakage reservoir of the dynamic sealing portion of the sealing arrangement and at least the one medium to be sealed by means of the dynamic sealing portion are selected so that the volume of the leakage reservoir is greater than a volume of the medium which is formed by a stroke of the movable component multiplied by a cross-sectional area of a lubrication film formed by means of the medium on the movable component.

* * * * *